United States Patent
Werner et al.

(10) Patent No.: US 7,134,883 B2
(45) Date of Patent: Nov. 14, 2006

(54) CONNECTING BOX FOR CONNECTING TO A SOLAR PANEL

(75) Inventors: Elke Werner, Darmstadt (DE);
Guenter Feldmeier, Lorsch (DE);
Heinz Scherer, Bensheim (DE);
Markus Strelow, Moerlenbach (DE);
Andreas Woeber, Kronau (DE)

(73) Assignee: Tyco Electronics AMP GmbH, Bensheim (DE)

( * ) Notice: Subject to any disclaimer, the term of this patent is extended or adjusted under 35 U.S.C. 154(b) by 0 days.

(21) Appl. No.: 10/895,495

(22) Filed: Jul. 21, 2004

(65) Prior Publication Data
US 2005/0054219 A1    Mar. 10, 2005

(30) Foreign Application Priority Data
Jul. 21, 2003   (DE) ............... 203 11 184 U

(51) Int. Cl.
*H01R 12/00* (2006.01)
(52) U.S. Cl. .......... 439/76.1; 439/535; 361/752; 174/50; 136/244
(58) Field of Classification Search ........ 439/76.1, 439/535; 361/752; 174/50; 136/244
See application file for complete search history.

(56) References Cited

U.S. PATENT DOCUMENTS

| 4,310,211 | A |   | 1/1982  | Bunnell et al. |
| 4,460,232 | A |   | 7/1984  | Sotolongo |
| 5,280,133 | A | * | 1/1994  | Nath ................ 174/52.1 |
| 5,513,075 | A |   | 4/1996  | Capper et al. |
| 6,245,987 | B1 | * | 6/2001  | Shiomi et al. ........ 136/244 |
| 6,247,258 | B1 | * | 6/2001  | O'Malley ............ 40/606.02 |
| 6,283,769 | B1 |   | 9/2001  | Asao et al. |
| 6,307,515 | B1 |   | 10/2001 | Sauer et al. |
| 6,344,612 | B1 | * | 2/2002  | Kuwahara et al. ...... 174/50 |
| 6,409,522 | B1 | * | 6/2002  | Onizuka ............... 439/74 |
| 6,430,054 | B1 | * | 8/2002  | Iwata ................ 361/752 |
| 6,543,940 | B1 | * | 4/2003  | Chu .................. 385/53 |
| 6,582,249 | B1 | * | 6/2003  | Boeck et al. .......... 439/492 |

FOREIGN PATENT DOCUMENTS

| DE | 201 13 643 U1 | 1/2002 |
| EP | 0 999 601 A1  | 5/2000 |
| EP | 1 102 354 A2  | 5/2001 |
| JP | 2002-359389   | 12/2002 |
| WO | WO 00/30216   | 5/2000 |

* cited by examiner

*Primary Examiner*—Truc Nguyen
(74) *Attorney, Agent, or Firm*—Barley Snyder LLC

(57) ABSTRACT

A connecting box with a printed circuit board is described which has electrical components electrically connected to conductor rails of the connecting box. The printed circuit board is preferably held in the connecting box by an adhesive layer. Simple assembly and disassembly of the components is possible as a result of the use of the printed circuit board. In addition, the heat generated in the components can be better dissipated via the printed circuit board.

8 Claims, 4 Drawing Sheets

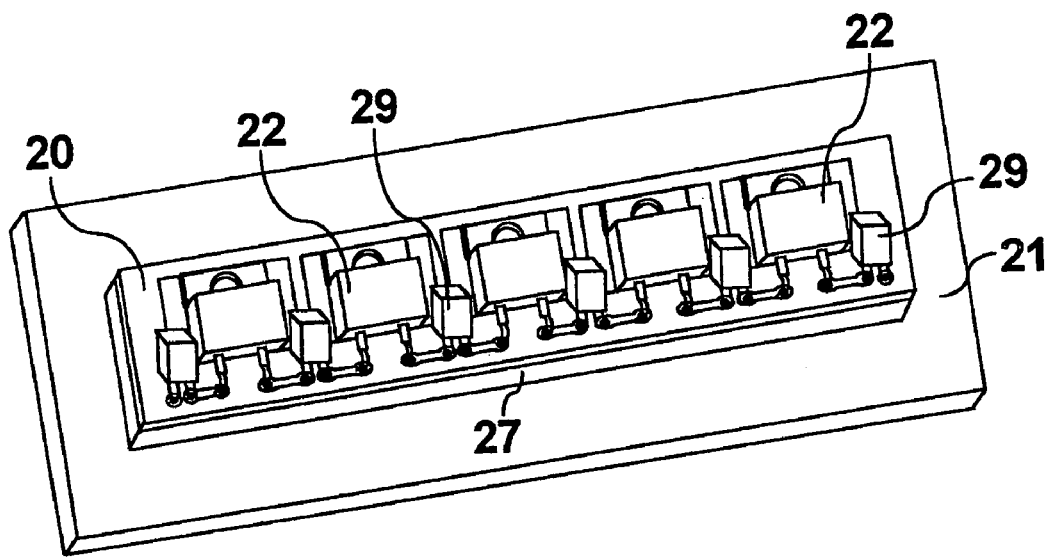
Fig. 6
Fig. 7
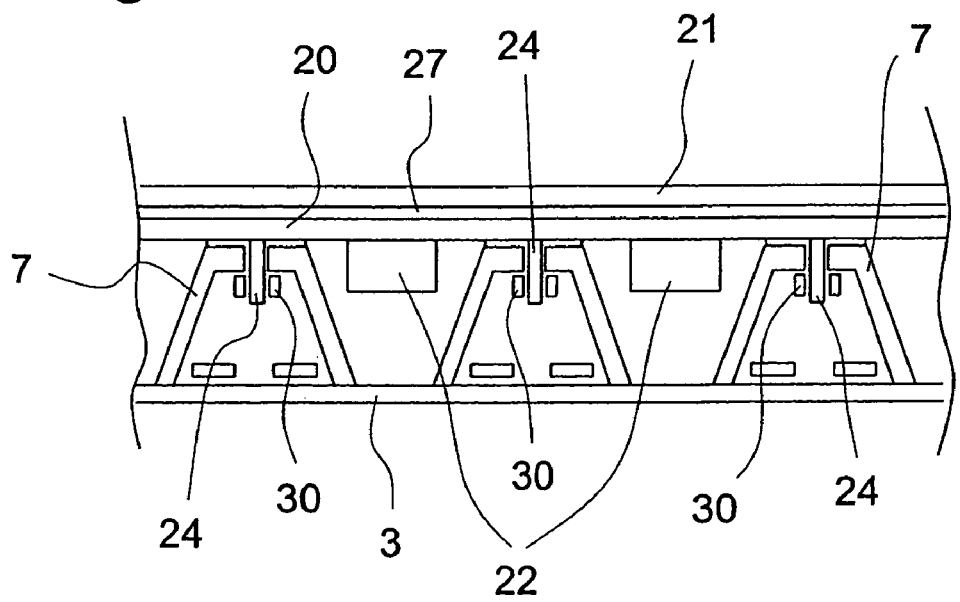

CONNECTING BOX FOR CONNECTING TO A SOLAR PANEL

FIELD OF THE INVENTION

The invention relates to a connecting box for connection to a solar panel

BACKGROUND OF THE INVENTION

Connecting boxes are used in a wide variety of technical sectors in order to make electrical connections between electric lines and an electrical device. Solar panels have a large number of solar cells which are used to convert power from sunlight. The power generated by the solar cells is conveyed via electric lines, for example to a rectifier, for feeding into an alternating current (AC) network or to a battery. A connecting box is generally provided for electrical connection to the lines of the solar panel.

A corresponding connecting box is known from European patent application EP 1 102 354 A2. The connecting box has a housing, in the base board of which is provided an opening for introducing the electric lines of the solar panel. Electrical contacts for contacting the electric lines are provided in the connecting box. The electrical contacts are in turn connected to terminal pins which are arranged in a side wall of the housing and are used for connecting electric lines. The connected electric lines lead to the rectifier or to the battery. Conductor rails comprising a contact region for detachable connection of a foil conductor of the solar panel are provided in the housing as the electrical contacts. The contact region comprises a metal clamping spring to which the foil contact can be securely clamped. For introducing the foil contact, the clamping spring is opened in a clamping region by means of a tool, then the foil contact is introduced into the clamping spring and the tool then removed from the clamping spring, so the clamping spring recoils into the starting position and in the process securely clamps the foil contact.

The known connecting box has the drawback that components which are connected to the electrical contact elements of the connecting box are relatively complex to assemble.

SUMMARY OF THE INVENTION

A connecting box for connecting to a solar panel has a housing in which an opening is provided for feeding electric lines of the solar panel. Contact elements are located inside the housing for connecting to the electric lines. Electrical components are connected to the contact elements. The components are arranged on a printed circuit board and the printed circuit board is held in the housing.

BRIEF DESCRIPTION OF THE DRAWINGS

The invention will be described in more detail hereinafter with reference to the figures, in which:

FIG. 6 is a perspective view showing a printed circuit board fastened to the lid and FIG. 7 is a cross-sectional view through a connecting box.

DETAILED DESCRIPTION OF THE INVENTION

Figure 1:
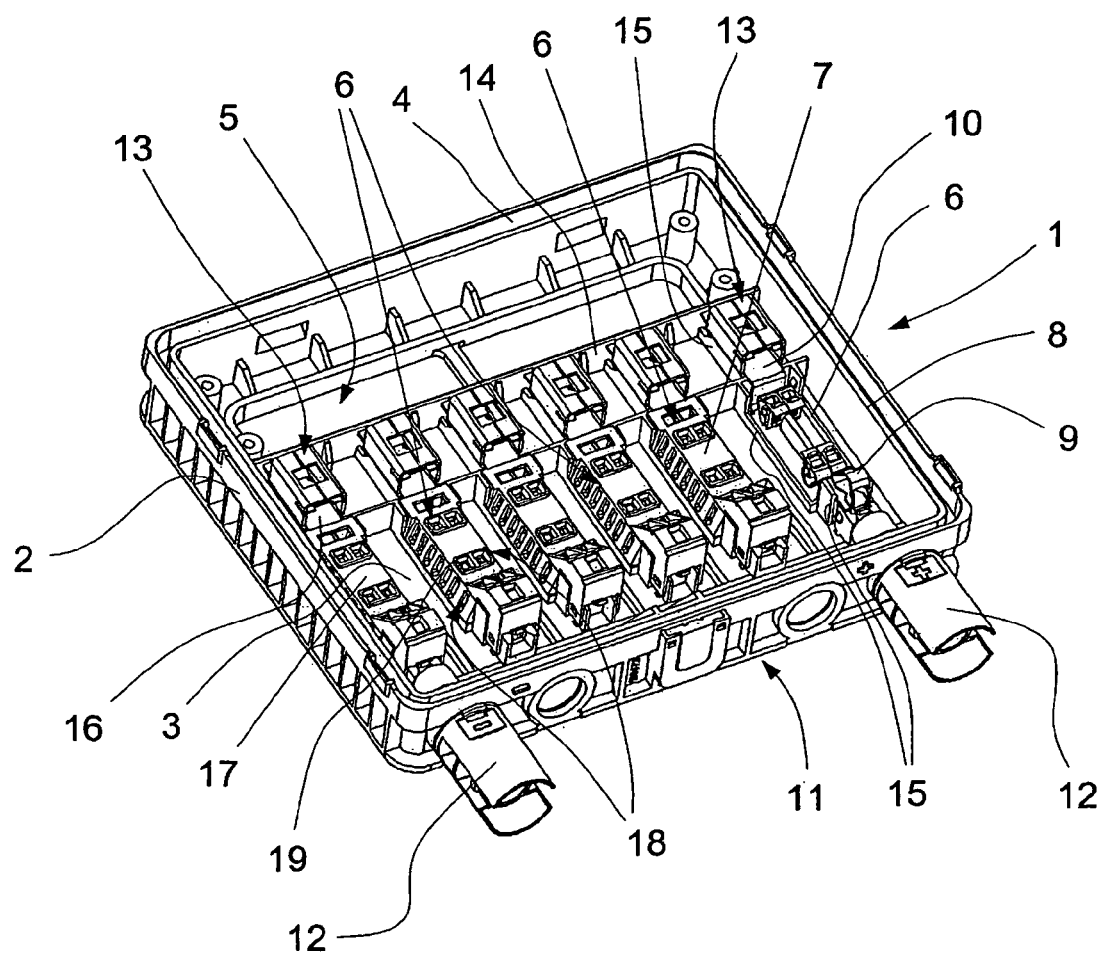
FIG. 1 is a perspective view of a connecting box without a lid.

FIG. 1 shows, in a perspective view, a housing 1 of a connecting box without a lid. The housing 1 comprises a peripheral edge 2 and a base board 3. An opening 5 is formed in the base board 3 adjacent to a back edge region 4. Six conductor rails 6 are arranged on the base board 3. Two to six conductor rails 6 may be arranged depending on the construction. A respective cover 7 is provided on five conductor rails 6. One conductor rail 6, arranged next to a right-hand side wall 8, is shown without the cover 7. One conductor rail 6 comprises a first contact element 9 opposite a second contact element 10. The first contact elements 9 of the conductor rails 6 are associated with a connection side 11 of the housing 1. The second contact elements 10 of the conductor rails 6 are associated with the opening 5. The conductor rails 6 are arranged parallel and side by side. Contact terminals 12 are arranged on the connection side 11 of the housing 1. The contact terminals 12 are either constructed as contact plugs or as contact sockets. The two contact terminals 12 are each electrically connected to the first contact elements 9 of the outer conductor rails 6.

The second contact elements 10 are surrounded by a contact cage 13. The second contact elements 10 are associated with openings of a wall 14 used for feeding electric lines from the solar panel. The wall 14 extends adjacent to the opening 5 over the entire width of the housing 1.

Holding devices 15, into which the conductor rails 6 are inserted, are provided on the base board 3. The holding devices 15 are also used to hold the covers 7 and the contact cages 13.

The contact cages 13 have insertion openings 16 facing the conductor rails 6 into which the second contact elements 10 are positioned in the contact cage 13.

Each cover 7 has an upper side 17 which is substantially rectangular in construction and is arranged along the longitudinal direction of the conductor rail 6. The upper side 17 has side walls 18 arranged to be angled downwards at the side and inserted into the holding devices 15. Contact openings 19 are located on the upper side 17. The contact openings 19 are arranged over contact regions of the conductor rails 6 and can therefore be contacted through the cover 7. The upper side 17 is substantially constructed as a flat face. The upper sides of the covers 7 are preferably arranged on approximately the same plane. The upper sides 17 therefore form a relatively large overall bearing surface for a printed circuit board 20 (FIG. 2).

Figure 2:
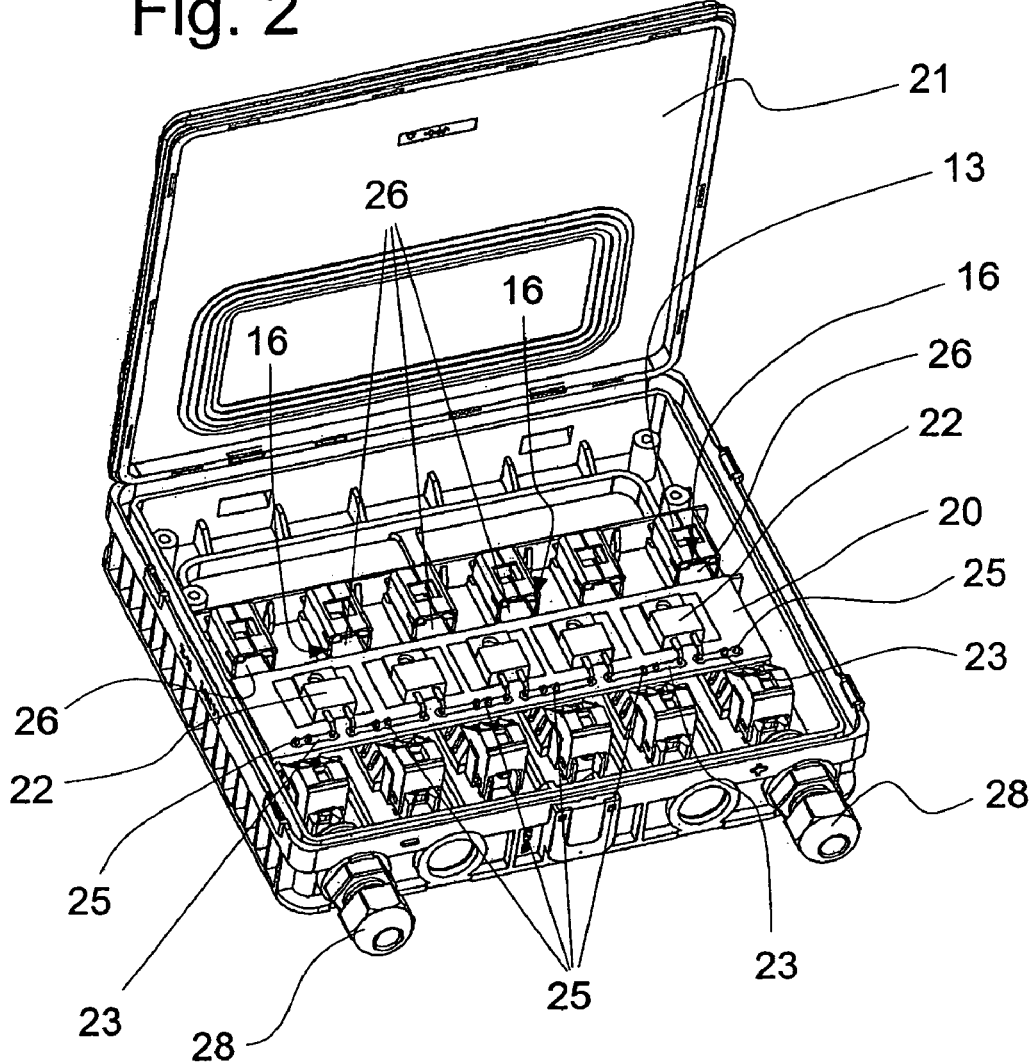
FIG. 2 is a perspective view of the connecting box with a lid and with printed circuit board.

FIG. 2 shows the connecting box of FIG. 1 comprising a printed circuit board 20 and a lid 21. The printed circuit board 20 comprises components 22 which are assembled on the printed circuit board 20 and connected by electrical terminals to traces 23 of the printed circuit board 20. The traces 23 produce an electrical connection between the components 22 and terminal pins 24 which are arranged on the lower side of the printed circuit board 20 and are thus not visible in FIG. 2. The terminal pins 24 are guided through the contact openings 19 in the contact regions of the conductor rails 6 and therefore produce an electrical connection between the conductor rails 6 and the components 22. The components 22 may be diodes, which depending on the embodiment and connection of the conductor rails, are connected to positive or negative lines of a solar panel and connect the conductor rails 6 to one another in a desired electrical function. The three right-hand conductor rails 6 are connected in this example to electric lines of the solar panel which carry a positive voltage. The three left-hand conductor rails 6 are connected in this embodiment to electric lines of the solar panel which carry a negative voltage.

The terminal pins 24 are arranged on the lower side of the printed circuit board and are electrically connected to the traces 23 via plated through holes 25. In this embodiment the printed circuit board 20 has terminals 26 which are led out of the printed circuit board 20 at a longitudinal side thereof and are inserted in insertion openings 16 of the contact cages 13. The width of the terminals 26 is adapted to the width of the insertion openings 16 such that a spring loaded connection is produced between the printed circuit board 20 and the contact cages 13. In addition, the printed circuit board 20 is located on the upper sides 17 of the covers 7. Components which can be surface mounted for example are used as the components 22.

In contrast to the housing 1 in FIG. 1, the housing 1 of FIG. 2 comprises cable openings 28 via which the electric cable can be connected to the conductor rails 6.

Instead of the terminal pins 24, electric lines may also be provided.

Figure 3:
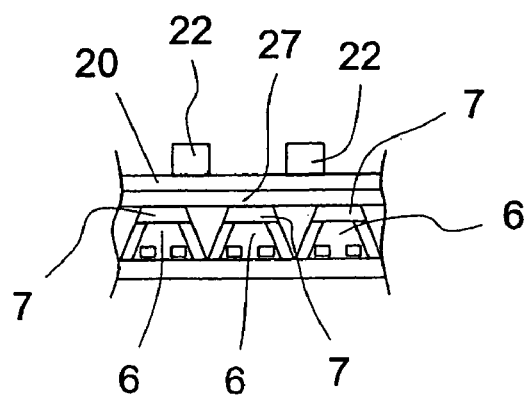
FIG. 3 is a cross-sectional view through the printed circuit board and the contact elements.

FIG. 3 shows a cross-section through conductor rails 6 and the printed circuit board 20. An adhesive layer 27 in the form of a continuous adhesive layer is formed between the printed circuit board 20 and the covers 7. The printed circuit board 20 thus adheres to the covers 7 which are in turn rigidly connected to the housing 1 via the holding devices 15. The adhesive layer 27 is preferably arranged only in the region of the upper sides 17. The adhesive layer 27 can be constructed as a heat conducting layer, depending on the embodiment. In a further embodiment the adhesive layer 27 is produced by a preferably heat conducting adhesive foil.

Figure 4:
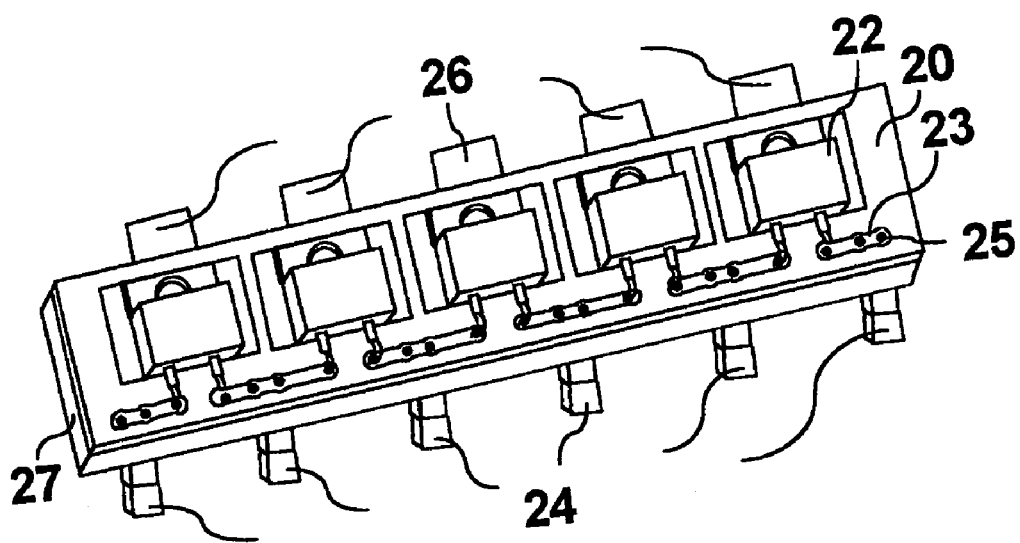
FIG. 4 is a perspective view of a first embodiment of the printed circuit board.

FIG. 4 shows the printed circuit board of FIG. 2, the adhesive layer 27 being provided on the lower side of the printed circuit board 20 on which the terminal pins 24 are also arranged with which an electrical connection is made between the components 22 of the printed circuit board 20 and the conductor rails 6. In the process the terminal pins 24 are inserted through the contact openings 19 of the covers 7 in contact regions 30 of the conductor rails 6.

Figure 5:
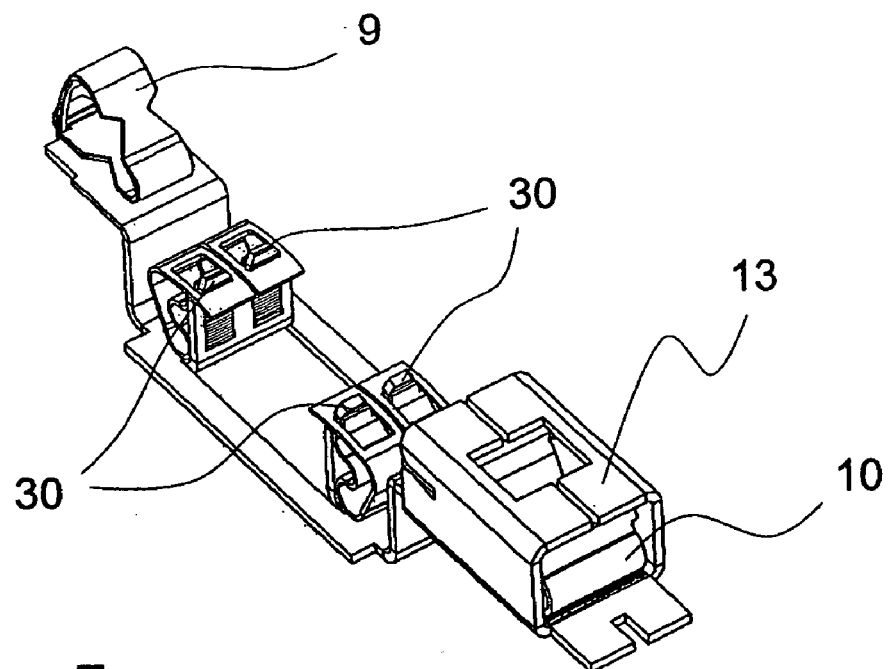
FIG. 5 is a perspective view of a conductor rail.

FIG. 5 shows, in a perspective view, a conductor rail 6 comprising a first and a second contact element 9, 10. The conductor rail 6 has four contact regions 30 which are arranged between the first and the second contact element 9, 10. Two respective contact regions 30 are associated with the first or second contact element 9, 10. A contact region 30 is illustrated in the embodiment shown by a spring clip.

FIG. 6 shows detail of a further embodiment of a printed circuit board 20 in which the components 22 are arranged on the lower side of the printed circuit board 20, like the pin contacts 29. An adhesive layer 27 with which the printed circuit board 20 is glued to the lid 21 in the assembled state, is constructed on the upper side of the printed circuit board 20 in this embodiment.

FIG. 7 shows a cross-section through the housing 1 of the printed circuit board 20 of FIG. 6 assembled in the connecting box. In this embodiment the components 22 are arranged between the covers 7. The pin contacts 29 are guided through the contact openings 19 of the covers 7 into the contact regions 30. The adhesive layer 27, which is glued to the lid 21, is formed on the upper side of the printed circuit board 20.

The printed circuit board 20 can be constructed as a rigid or flexible printed circuit board, depending on the embodiment. The printed circuit board can be latched, screwed or caulked for holding purposes.

The connecting box has an advantage that a printed circuit board is provided on which the components are arranged and the printed circuit board is held in the housing. Simple assembly and disassembly of a plurality of components is simultaneously possible as a result of the arrangement of the printed circuit board. In addition, the heat generated by the components can be better dissipated as a result of the printed circuit board.

Advantageously, the printed circuit board is inserted and held in holding recesses of the contact elements. It is therefore not necessary to provide new holding recesses, for example in the housing of the connecting box. The printed circuit board comprises appropriate holding elements for holding purposes. The printed circuit board is held in the connecting box by an adhesive layer. The use of the adhesive layer provides a simple and secure connecting technique between the printed circuit board and the connecting box. The adhesive layer may be formed from a heat conducting material. The heat generated by the components can therefore be conveyed via the printed circuit board and the adhesive layer to the connecting box or the cover of the connecting box. Improved heat dissipation is thus possible. The adhesive layer may be constructed as a heat conducting adhesive foil. The use of a heat conducting adhesive foil allows simple, reliable and inexpensive connection of the printed circuit board to the connecting box.

The adhesive layer may also advantageously be arranged between the printed circuit board and the housing, in particular on a lid of the connecting box. The heat of the components is thus conveyed via the housing to the environment.

In a further advantageous embodiment the adhesive layer is arranged between the printed circuit board and the contact elements. As the contact elements are manufactured from metal material particularly good heat dissipation is possible via the contact elements.

The components may also be arranged between the contact elements on the lower side of the printed circuit board. A compact arrangement of the components is thus achieved.

What is claimed is:

1. A connecting box for connecting to a solar panel comprising:
    a housing in which an opening is provided for feeding electric lines of the solar panel;
    conductor rails having contact elements located on opposite sides thereof, the contact elements located inside the housing for connecting to the electric lines;
    electrical components electrically connected to the contact elements through contact regions of the conductor rails, the components being arranged on a printed circuit board and the printed circuit board being held in the housing; and
    each of the conductor rails having a cover with at least one opening through which access is provided to the contact regions of the conductor rails, the cover having a bearing surface receiving the printed circuit board such that terminal pins of the printed circuit board are guided through the opening to the contact regions.

2. The connecting box according to claim 1, wherein the contact element comprises a holding recess, the printed circuit board comprises a holding element, and the holding element is inserted in the holding recess to secure the printed circuit board.

3. The connecting box according to claim 1, wherein the printed circuit board is held in the connecting box by an adhesive layer.

4. The connecting box according to claim 1, wherein the components are arranged on the lower side of the printed circuit board, and the components are arranged between the contact elements.

5. The connecting box according to claim 3, wherein the adhesive layer is heat conducting.

6. The connecting box according to claim 3, wherein an adhesive foil is arranged as the adhesive layer.

7. The connecting box according to claim 3, wherein the adhesive layer is arranged between the printed circuit board and the housing.

8. The connecting box according to claim 3, wherein the adhesive layer is arranged between the printed circuit board and the covers.

\* \* \* \* \*